US008295564B2

(12) United States Patent
Hahn

(10) Patent No.: US 8,295,564 B2
(45) Date of Patent: Oct. 23, 2012

(54) MARKING A LOCATION IN A MEDICAL IMAGE

(75) Inventor: Horst Hahn, Bremen (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 1093 days.

(21) Appl. No.: 11/945,192

(22) Filed: Nov. 26, 2007

(65) Prior Publication Data

US 2009/0136097 A1 May 28, 2009

(51) Int. Cl.
*G06K 9/00* (2006.01)

(52) U.S. Cl. ........ 382/128; 382/129; 382/130; 382/131; 382/132; 378/9; 378/23; 378/24

(58) Field of Classification Search .................. 382/103, 382/106, 128, 129, 130, 131, 132, 133, 134, 382/168, 178, 181, 194, 199, 201, 203, 219, 382/232, 274, 276, 282, 286, 288, 291, 305; 378/9, 23, 24
See application file for complete search history.

(56) References Cited

U.S. PATENT DOCUMENTS

| 6,075,879 | A   | * | 6/2000  | Roehrig et al.   | 382/132   |
|-----------|-----|---|---------|------------------|-----------|
| 6,757,417 | B2  | * | 6/2004  | Licato et al.    | 382/131   |
| 7,313,259 | B2  | * | 12/2007 | Alyassin et al.  | 382/128   |
| 7,447,343 | B2  | * | 11/2008 | Barfuss et al.   | 382/128   |
| 7,787,677 | B2  | * | 8/2010  | Evertsz et al.   | 382/128   |
| 7,876,939 | B2  | * | 1/2011  | Yankelevitz et al.| 382/128  |
| 7,916,184 | B2  | * | 3/2011  | Utagawa et al.   | 348/231.6 |
| 2002/0081009 | A1 | * | 6/2002  | Licato et al.  | 382/131   |
| 2007/0230758 | A1 | * | 10/2007 | Fan et al.     | 382/128   |
| 2008/0044067 | A1 | * | 2/2008  | Evertsz et al. | 382/128   |
| 2008/0123910 | A1 | * | 5/2008  | Zhu            | 382/128   |
| 2008/0246724 | A1 | * | 10/2008 | Pan et al.     | 345/157   |
| 2009/0087067 | A1 | * | 4/2009  | Khorasani      | 382/132   |

FOREIGN PATENT DOCUMENTS

WO 2005001742 A 1/2005

OTHER PUBLICATIONS

International Search Report and Written Opinion of an International Application PCT/EP2007/058540, Dated Jan. 31, 2008.
International Search Report and Written Opinion of an International Application PCT/EP2007/058540, Dated Jan. 22, 2008.
U.S. Appl. No. 11/465,074, filed Aug. 16, 2006.
U.S. Appl. No. 11/465,386, filed Aug. 17, 2006.

* cited by examiner

*Primary Examiner* — Michael Logie
(74) *Attorney, Agent, or Firm* — Matthew B. Dernier, Esq.; Gibson & Dernier LLP

(57) ABSTRACT

Methods and apparatus provide for marking a location in a medical image, including: providing a first marker within a first medical image, which shows an object, at a first location, determining a second location, which corresponds to the first location, within a second medical image showing the same object, marking the second location with a second marker, which is different to the first marker, and presenting the first medical image, the first marker, the second medical image and the second marker.

8 Claims, 3 Drawing Sheets

MARKING A LOCATION IN A MEDICAL IMAGE

FIELD OF THE INVENTION

The invention relates to a marking apparatus, a marking method and a computer program for marking a location in a medical image.

BACKGROUND OF THE INVENTION

Sets of several medical images of the same object can, for example, be obtained by a medical imaging device, like a computed tomography device, a magnetic resonance imaging device, an ultrasound device, an x-ray projection device or a nuclear imaging device. A user, like a radiologist, often marks a region within one of these medical images, which can be regarded as a first image, and wants to see regions, which corresponds to the marked region, in at least one of the other images, which can be regarded as second images. Reviewing several images for finding corresponding regions in different images of the same object is very time consuming.

SUMMARY OF THE INVENTION

It is an object of the present invention to provide a marking apparatus, a marking method and a computer program for marking a location in a medical image, which reduce the time for finding corresponding locations in different medical images of the same object.

In an aspect of the present invention a marking apparatus for marking a location in a medical image is presented, wherein the marking apparatus comprises: a providing unit for providing a first marker within a first medical image, which shows an object, at a first location, a location determination unit for determining a second location, which corresponds to the first location, within a second medical image showing the same object, a marking unit for marking the second location with a second marker, which is different to the first marker, and a presenting unit for presenting the first medical image, the first marker, the second medical image and the second marker.

The second marker shows a location within the second medical image, which has been determined as corresponding to the first location in the first medical image. A user like a radiologist can therefore look at the second marker for finding a location in the second medical image, which corresponds to the provided first location in the first medical image. Furthermore, since the second marker is different to the first marker, a user can see that the second marker is not provided by the providing unit, which has provided the first marker, but by using the local determination unit, which has determined the second location, which should correspond to the first location, within the second medical image. This is important, because the determination of the second location could be inaccurate, for example, because of movements of the object, which is, preferentially, a patient. The presentation of the second marker in the second medical image reduces therefore the time needed by a user for finding a location within the second image, which corresponds to the first location in the first medical image, and it is shown to the user that the second marker is not provided by the providing unit, but determined by the local determination unit, and could be inaccurate.

The providing unit is, for example, a storing unit, in which the first medical image and the first marker are stored. Preferentially, the providing unit comprises an input unit for allowing a user, like a radiologist, to set the first marker in the first medical image, for example, by using a graphical user interface, in particular, by using a mouse pointer. The providing unit can also be a unit, which generates marks for indicating suspicious regions, in particular, regions which are suspicious for cancer. Thus, a providing unit could also be a CAD mark generation unit.

The first and the second medical images are, for example, two- and/or three-dimensional medical images. For example, all medical images can be two-dimensional images or three-dimensional images, or the first medical image can be a two-dimensional image and the second medical image can be a three-dimensional image, or the first medical image can be a three-dimensional image and the second medical image can be a two-dimensional image. The first and the second medical images can be generated by the same or different medical imaging devices.

If several medical images are present, the first medical image is preferentially an image, which has been selected by a user as a first medical image, preferentially, simply by marking a first location in one of the several medical images with a first marker. Preferentially, the second medical image is one of the further medical images. But, it is also preferred that several or all of the further medical images are second medical images, in which a second marker is determined and presented. In a preferred embodiment, also the one or several second medical images, in which a second marker is determined and presented, is selectable by a user.

The local determination unit preferentially uses common coordinate systems of the first and second medical images, which are provided by a medical imaging device such as a computed tomography device, a magnetic resonance imaging device or a nuclear imaging device like a positron emission tomography or a single photon emission computer tomography device. In other embodiments, pattern matching techniques can be used for finding corresponding locations in different images. Moreover, also external reference systems such as a navigation system present during the acquisition of one or two of the first and/or second images, respectively, could be used to establish a location correspondence between images.

A presenting unit comprises, preferentially, a monitor for presenting the first medical image, the first marker, the second medical image and the second marker.

Preferentially, the marking unit is adapted for providing the second marker as a broad marker. A broad marker is a marker, which does not mark a point within the second medical image only. The broad marker is, for example, a diffuse area and/or an area having another, in particular, a lower or higher, resolution than the second medical image outside this area, or the broad marker is preferentially an enclosed region.

It is further preferred that the marking apparatus comprises an uncertainty determining unit for determining the uncertainty of the correspondence of the first location and the second location. This gives a user the possibility to assess the quality of the determination of the second location in the second medical image, which should correspond to the first location within the first medical image.

It is further preferred that the marking unit is adapted for modifying the second marker in dependence on the determined uncertainty. This allows a user to directly see at the second marker a reliability of the determination of the second location in the second medical image. For example, the colour, the intensity or the shape of the second marker can be modified in dependence on the determined uncertainty. For example, the colour red could indicate an uncertainty above a predefined threshold and a green colour could indicate an uncertainty below a predefined threshold.

The uncertainty determination could be based on prior knowledge or information regarding the accuracy of a given location determination strategy. Preferentially, the uncertainty determination will also comprise an image based technique that tries to match corresponding regions within the first and second image, respectively. Also the uncertainty determination unit could comprise a model or prior assumptions or knowledge about movement patterns to be expected in a given situation, for example breathing motion patterns.

It is further preferred that the marking unit is adapted for providing the second marker as a broad marker, wherein the broadening depends on the determined uncertainty. Preferentially, the broadening depends on the determined uncertainty such that the probability that the location, which corresponds to the first location, is within the broad second marker, is above a predefined threshold. Preferentially, the broadening of the marker increases with the degree of uncertainty.

In a further preferred embodiment, the uncertainty determination unit combines several criteria for the joint assessment of location determination uncertainty, possibly resulting in complex or elongated shapes for a broad second marker. For example, in a situation where the first image is a two-dimensional projection image and the second image is a three-dimensional image showing the same anatomical structure, a certain location on the first image would typically correspond to a linear region on the second image. Moreover, if the location determination from the projection image to the three-dimensional image is affected by a certain uncertainty, the joint uncertainty determination could result in an extended tube instead of a single line for the second broad marker.

It is further preferred that the uncertainty determining unit is adapted for determining the uncertainty in different directions and wherein the marking unit is adapted for providing the second marker as a broad marker, wherein the broadening in different directions depends on the uncertainty in these directions. Since the uncertainty might be different in different directions, such a broad marker gives a user, in particular, a radiologist, a better impression of the degree of uncertainty of the determination of the second location within the second medical image.

It is further preferred that the marking apparatus comprises a selection unit for allowing a user to select the first and/or second marker, wherein the presenting unit is adapted for showing the selected marker, respectively, within the first or second medical image, respectively. Several first and/or second markers can be present within the first and second medical image, wherein preferentially each second marker corresponds to a first marker. Preferentially, a user can select a first or second marker in a first or second medical image and the presentation unit shows this selected marker on, for example, a screen of a monitor. If, for example, the second image is a three-dimensional image, the presentation unit shows, preferentially, a two-dimensional image slice of the three-dimensional second medical image, which contains the selected marker. In this way, a user can easily jump to a first or desired second marker. Preferentially, the user can select a first or second marker from a list or other representation of all first and/or second markers that are present in the respective medical image. Markers are present in a medical image either if they have been defined in this medical image as first marker or if they have been marked by the marking unit as a second marker at a location determined by the location determination unit.

Several first and second markers can be present, wherein the marking apparatus can be adapted such that, for example, a user, can switch selected first and/or second markers on or off, respectively. A marker, which has been switched off, is, preferentially, not shown by the presenting unit or shown such that this marker is less prominent than the markers, which are switched on, for example, by showing them with a smaller brightness or a smaller resolution.

It is further preferred that the second marker is a circle or a sphere. In particular, a second marker having this shape is preferred, if the uncertainty of the determination of the second location can be assumed as being undirected or isotropic, or if the degree of uncertainty in different directions can not be foreseen or can not or will not be determined. Preferentially, if the uncertainty of the determination of the second location is mainly based on movements of a patient, the second marker is preferentially a circle or a sphere.

In a further aspect of the present invention a marking method for marking a location in a medical image is presented, wherein the method comprises following steps: providing a first marker within a first medical image, which shows an object, at a first location, determining a second location, which corresponds to the first location, within a second medical image showing the same object, marking the second location with a second marker, which is different to the first marker, presenting the first medical image, the first marker, the second medical image and the second marker.

In a further aspect of the present invention a computer program for marking a location in a medical image is presented, wherein the computer program comprises program code means for causing a computer to carry out the steps of the method as defined in one or more of the embodiments above.

It shall be understood that preferred embodiments of the invention can also be any combination of the dependent claims with the respective independent claim.

BRIEF DESCRIPTION OF THE DRAWINGS

These and other aspects of the invention will be apparent from and elucidated with reference to the embodiments described hereinafter. In the following drawings.

DETAILED DESCRIPTION OF EMBODIMENTS

Figure 1:
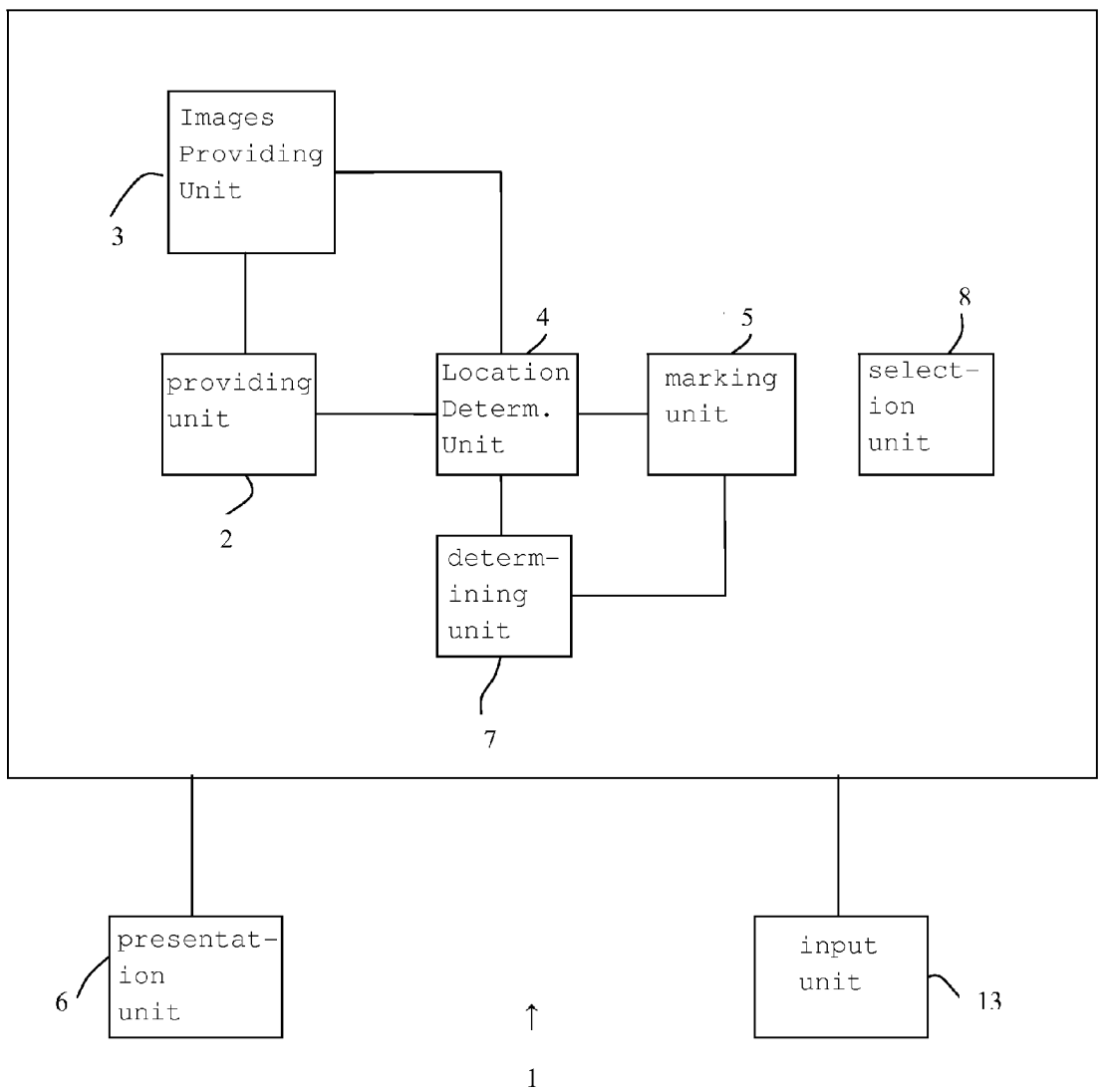
FIG. 1 shows schematically and exemplarily a marking apparatus for marking a location in a medical image.

FIG. 1 shows schematically and exemplarily an embodiment of a marking apparatus 1 for marking a location in a medical image. The marking apparatus 1 comprises a providing unit 2 for providing a first marker within a first medical image, which shows an object, at a first location. The first medical image is provided by an images providing unit 3.

The images providing unit 3 is adapted for providing first and second medical images. The image providing unit 3 is, preferentially, a storing unit, in which medical images are stored. The images providing unit 3 can also comprise an images transferring network, in particular, within a hospital, wherein images are transferred to the providing unit 2 and a location determination unit 4 via this network. The images providing unit 3 can also comprise a medical imaging device.

The first and second medical images belong preferentially to a single group of medical images. The group of medical images belong preferentially to the same medical case, i.e., in particular, to the same patient and preferentially to the same examination.

In this embodiment, the providing unit 2 is adapted such that a user, for example, a radiologist, can define a first location within a first image, which is shown on the presenting unit 6, which is, in this embodiment, a monitor, by using the input unit 13, which comprises, in this embodiment, a keyboard and a mouse. Thus, in this embodiment, the providing unit 2 is adapted such that a user can define a first location within the first medical image such that a user can mark this first location with a first marker. The first marker is preferentially a cross. The providing unit 2 is preferentially further adapted such that a user can select an image as a first medical image from a set of medical images provided by the images providing unit 3. Preferentially, this selection is performed simply by setting a first marker in the desired medical image shown on the presentation unit 6.

The marking apparatus 1 further comprises the location determination unit 4 for determining a second location, which corresponds to the first location, within a second medical image showing the same object as shown in the first medical image. Preferentially, the location determination unit 4 determines a second location in each medical image of the same group of images provided by the images providing unit 3 to the location determination unit 4, which is not the first medical image. In another embodiment, the marking apparatus can be adapted such that a user can select medical images, which are regarded as second medical images and in which the location determination unit 4 determines a second location. For determining the second location, which corresponds to the first location, the location determination unit 4 preferentially uses a coordinate system, which is the same in the first medical image and the second medical image and which is preferentially generated by the medical imaging device, which has generated the first and the second medical image, and which is provided to the location determination unit 4 by the images providing unit 3. In other embodiments, other techniques can be used for determining a second location in a second medical image, which corresponds to a first location in a first medical image.

Preferentially, if available, location correspondence is provided by joint coordinate systems that are applicable for both the first image and one or several second images. If such joint coordinate system is unavailable, pattern matching techniques such as image co-registration might be applied to establish such correspondence.

The marking apparatus 1 further comprises a marking unit 5 for marking the second location with a second marker, which is different to the first marker. In this embodiment, the second marker is a closed line, which encloses a region comprising the determined second location and which is shaped in accordance with an uncertainty of the correspondence of the first location and the second location. This uncertainty is determined by an uncertainty determining unit 7.

The uncertainty determination could be based on prior knowledge or information regarding the accuracy of a given location determination strategy. Preferentially, the uncertainty determination will also comprise an image based technique that tries to match corresponding regions within the first and second image, respectively. The success of such attempt could be measured from the regional image similarity. Also the uncertainty determination unit could comprise a model or prior assumptions or knowledge about movement patterns to be expected in a given situation, for example breathing motion patterns.

In a further preferred embodiment, the uncertainty determination unit combines several criteria for the joint assessment of location determination uncertainty, possibly resulting in complex or elongated shapes for a broad second marker. For example, in a situation where the first image is a two-dimensional projection image and the second image is a three-dimensional image showing the same anatomical structure, a certain location on the first image would typically correspond to a linear region on the second image. Moreover, if the location determination from the projection image to the three-dimensional image is affected by a certain uncertainty, the joint uncertainty determination could result in an extended tube instead of a single line for the second broad marker.

In another embodiment, the uncertainty determining unit 7 can be adapted such that a predefined uncertainty of the correspondence of the first location and the second location is provided to the marking unit 5. For example, the uncertainty determining unit 7 can comprise several degrees of uncertainty, which are assigned to different imaging modalities, different imaging parameters like the imaging sequence and/or different kinds of objects, for example, different parts of a patient. In an embodiment, the uncertainty determining unit 7 is adapted such that it provides the degree of uncertainty to the marking unit 5, which has been assigned to the features of the first and second medical image, like the mentioned imaging modality, imaging parameters and/or imaged object.

The first medical image, the first marker, the second medical image and the second marker are presented on the presenting unit 6.

The marking apparatus 1 further comprises preferentially a selection unit 8 for allowing a user to select the second marker, wherein the presenting unit 6 is adapted for showing the selected second marker within the second medical image. The selection unit 8 preferentially comprises a graphical user interface like a box shown on the presentation unit 6 containing a list of the different second markers, wherein a user can select one of these second markers preferentially by using a mouse pointer and by clicking on the desired second marker. The presenting unit 6 is preferentially adapted such that, after a user has selected the desired second marker, this selected second marker is shown within the corresponding second image data set on the presentation unit 6. For example, if the second medical image is a three-dimensional image, wherein, in this embodiment, a two-dimensional slice of this three-dimensional second medical image is shown on the presentation unit 6, the presentation unit 6 shows a slice of the second medical image, which contains the selected second marker, together with the selected second marker. Furthermore, if several first markers and corresponding second markers are present, one or several second markers could be selected by selecting the corresponding first marker.

Figure 2:
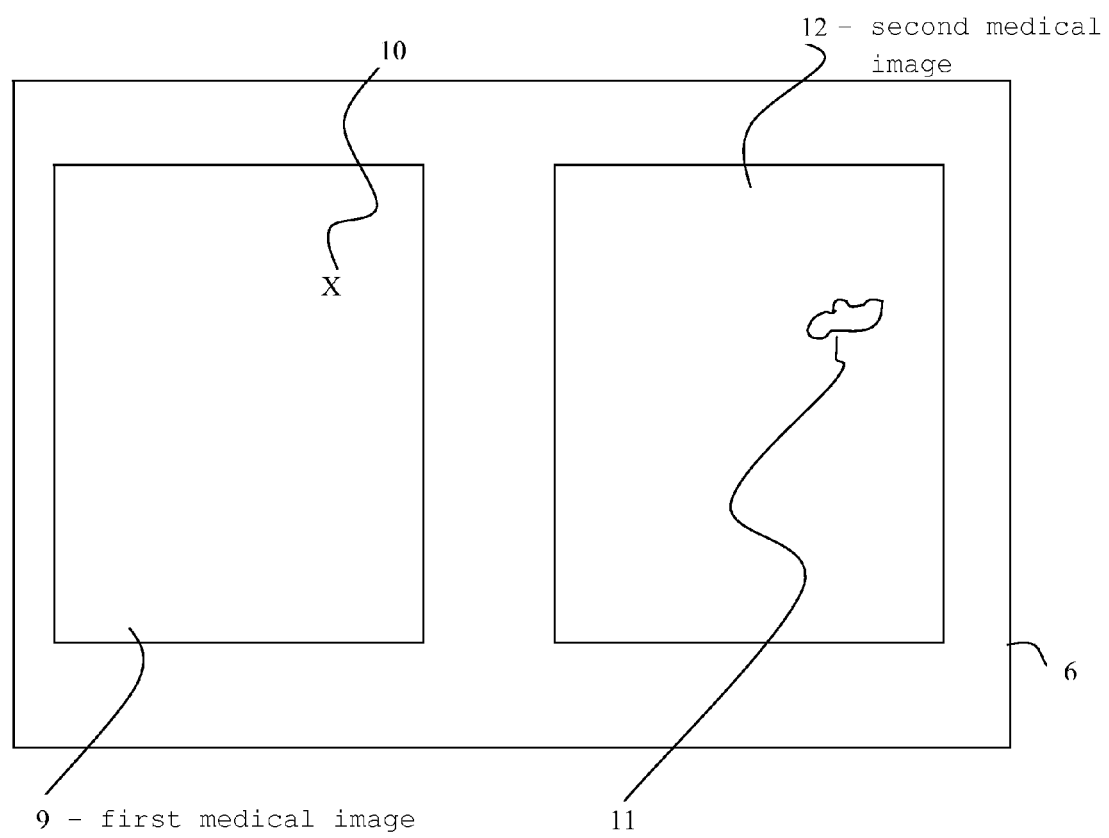
FIG. 2 shows schematically and exemplarily a presentation unit presenting a first image, a first marker, a second image and a second marker.

FIG. 2 shows schematically and exemplarily the presentation unit 6, in particular, a screen of the presentation unit 6, showing a first medical image 9 and a second medical image 11. The first medical image 9 comprises a first marker 10 indicating a first location. The location determination unit 4 has determined a second location, which corresponds to the first location in the first medical image marked by the first marker 10, in the medical image 12 and the marking unit 5 has marked a region within the second medical image 12 with the second marker 11, which contains the determined second location. The second marker 11 is shaped in accordance with an uncertainty of the correspondence of the first location and the determined second location determined by the uncertainty determining unit 7.

Figure 3:
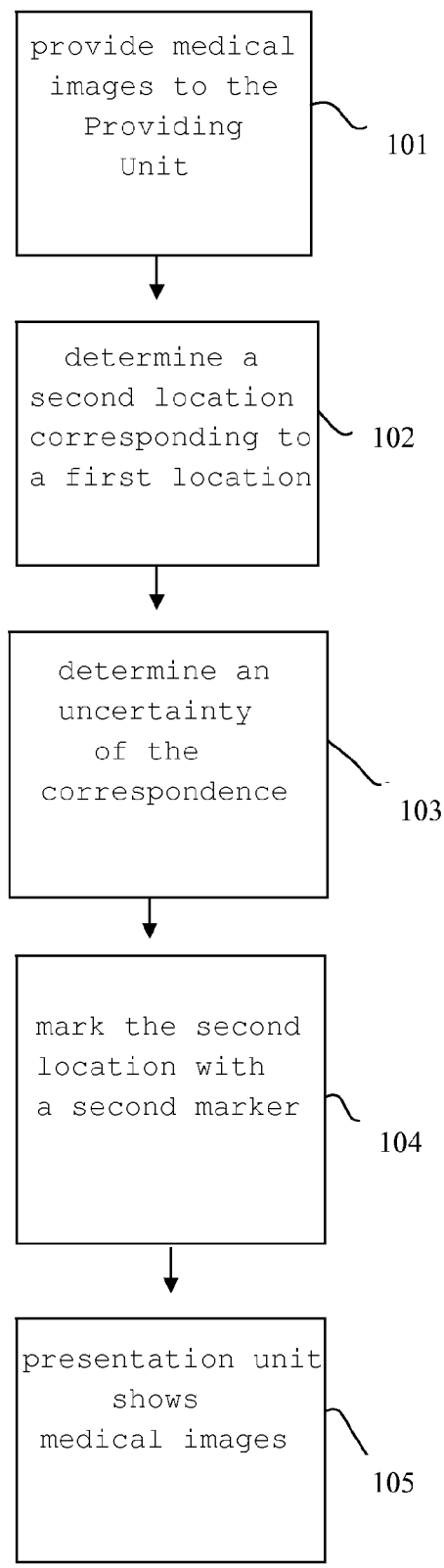
FIG. 3 shows schematically and exemplarily a flow chart illustrating a marking method for marking a location in a medical image.

In the following an embodiment of a marking method for marking a location in a medical image will be exemplarily described with reference to a flow chart shown in FIG. 3.

In step 101, the images providing unit 3 provides medical images to the providing unit 2 and a user selects one of these images as a first medical image by setting a first marker within one of these medical images provided by the images providing unit 3. The marker set by the user is the first marker and the medical image, in which this first marker is set, is the first medical image.

This first medical image containing the first marker and the further medical images are provided to the local determination unit 4. Preferentially, the first medical image and the further medical images define a group of medical images, which preferentially belong to a single medical case, in particular, which belong to the same patient and preferentially to the same examination. In step 102, the location determination unit 4 determines in each of the further medical images of the group a second location, which corresponds to a first location, which is marked by the first marker. These further medical images are regarded as second medical images. Thus, in each of these second medical images a second location is determined, which corresponds to the first location in the first medical image. In other embodiments, the further medical images, in which a second location, which corresponds to the first location, should be determined can be selected, for example, by a user, in particular, by using a graphical user interface.

In step 103, the uncertainty determination unit 7 determines the uncertainty of the correspondence of the first location and the second location for each second location determined in step 102.

In step 104, the marking unit 5 marks the second location with a second marker 11, which is different to the first marker 10, in each of the second medical images.

The second marker 11 is a broad marker, i.e. an extended marker not being a point marker, wherein the broadening depends on the determined uncertainty, in particular, the shape in different directions depends on the uncertainty in these different directions. In other embodiments, the second marker could be a circle or a sphere.

In step 105, the presentation unit 6 shows the first medical image, the first marker, the second medical image or the second medical images, and the one or several second markers. If there are several second images and/or several second markers, in the same second medical image or distributed over several second medical images, a user can select, which of these second medical images should be presented on the presentation unit 6. Furthermore, a user can select which of the several second markers should be shown on the presentation unit 6.

The first medical image, the first marker, the one or several second medical images and the one or several second markers do not have to be shown simultaneously. For example, if a second medical image is a three-dimensional image, a two-dimensional slice of the three-dimensional second image can be shown, which does not contain a second marker or which does not contain all second markers, wherein, for example, a user can search through the second medical image, in particular, slice-by-slice, for a second marker or a user can select a second marker using the selection unit and a two-dimensional slice showing the selected second marker can be shown.

Preferentially, the second marker defines a region within the second medical image, in which a location is likely to be present, which corresponds to a first location marked by the first marker in the first medical image. Thus, a user like a radiologist can look for the corresponding second location in the region marked by the second marker. The second marker can therefore be regarded as a hint.

Preferentially, as a result of an embodiment of the invention, soft-copy image reading tasks comprising multiple—at least two—images, which are preferentially two-dimensional or three-dimensional images, in particular, image series, covering the same anatomical region are rendered more secure and more efficient. They are preferentially more secure than without the presented concept as a finding in a given anatomical region is unlikely to be missed in corresponding second images, where the second marker will appear. Furthermore, since the first and the second marker are different, a possibly pointing imprecisely to the respective anatomical position can not be perceived as original finding and not misinterpreted accordingly. Furthermore, the efficiency of reviewing several images is improved, because the second markers lead a user to regions, in which a location, which corresponds to the first location, is contained with a high probability, in particular, the search of a user like a radiologist can start within the second marker or in the vicinity of the second marker.

Although in the above described embodiment, in particular in FIG. 2, only one first medical image and one second medical image are shown on the presentation unit 6, in other embodiments, one or more first medical images and one or more second medical images can be shown on the presentation unit 6. Furthermore, the presentation unit 6 can comprise more than one monitor, wherein, preferentially, the one or more first medical images and the one or more second medical images are shown on the different monitors of the presentation unit 6.

A first medical image can become a second medical image and a second medical image can become a first medical image. For example, if in a first step a user has set a first marker in a medical image, in this first step this medical image is regarded as the first medical image and further medical images, in particular, belonging to the same group of medical images, in particular, belonging to the same case, are regarded as second medical images. But, if in a further step the user sets a further first marker in one of the second medical images of the first step, this second medical image becomes a first medical image for this second step and a corresponding second marker is preferentially set in the further medical images of this group, in particular, in the first medical image of the first step, which is also a second medical image in the second step.

Although in the above described embodiment, in particular in FIG. 2, only one first marker and only one second marker is presented, one or several first markers in one or several medical images and one or several second markers in one or several medical images, which correspond to the respective first markers, can be present. A medical image can be a first medical image with respect to a certain combination of a first marker and a second marker and the same medical image can be a second medical image with respect to another combination of a first marker and a second marker.

Although in the above described embodiment the marking apparatus 1 comprises an uncertainty determining unit, in other embodiments, this uncertainty determining unit can be omitted. In this case, the second marker is shaped independently of the uncertainty of the correspondence between a first location and a determined second location.

Other variations to the disclosed embodiments can be understood and effected by those skilled in the art and practicing the claimed invention, from a study of the drawings, the disclosure, and the appended claims.

In the claims the word "comprising" does not exclude other elements or steps and the indefinite article "a" or "an" does not exclude a plurality.

A single processor or unit may fulfil the functions of several items recited in the claims. The mere fact that certain measures are recited in mutually different dependent claims does not indicate that a combination of these measures can not be used to advantage.

Determinations and calculations, like the determination of the second location, which corresponds to the first location, or the calculation of an uncertainty of the correspondence, which are performed by one or several units or devices, can be performed by any other number of units or devices. Also other functions of one or several units can be realized by any other number of units. The calculations, determinations and other functions described above, in particular, with respect to FIG. 1, and/or a control of the marking apparatus in accordance with the marking method can be implemented as program code means of a computer program and/or as dedicated hardware.

A computer program may be stored/distributed on a suitable medium, such as an optical storage medium or a solid-state medium supplied together with or as part of other hardware, but may also be distributed in other forms, such as via the internet or other wired or wireless telecommunication systems.

Any reference signs in the claims should not be construed as limiting the scope of the invention.

The invention claimed is:

1. A marking apparatus for marking a location in a medical image, comprising:
    a providing unit for providing a first marker within a first medical image, which shows an object, at a first location,
    a location determination unit for determining a second location, which corresponds to the first location, within a second medical image showing the same object,
    an uncertainty determining unit for determining an uncertainty of the correspondence of the first location and the second location,
    a marking unit for marking the second location with a second marker, which is different in appearance to the first marker, wherein the marking unit is adapted for providing the appearance of the second marker in dependence on the determined uncertainty,
    a presenting unit for presenting the first medical image, the first marker, the second medical image and the second marker.

2. The marking apparatus as defined in claim 1, wherein the marking unit is adapted for providing the second marker as a broad marker.

3. The marking apparatus as defined in claim 2, wherein the second marker is a circle or a sphere.

4. The marking apparatus as defined in claim 1, wherein the marking unit is adapted for providing the second marker as a broad marker, wherein the broadening depends on the determined uncertainty.

5. The marking apparatus as defined in claim 1, wherein the uncertainty determining unit is adapted for determining the uncertainty in different directions and wherein the marking unit is adapted for providing the second marker as a broad marker, wherein the broadening in different directions depends on the uncertainty in these directions.

6. The marking apparatus as defined in claim 1, further comprising a selection unit for allowing a user to select the first and/or second marker, wherein the presenting unit is adapted for showing the selected first or second marker, respectively, within the first or second medical image, respectively.

7. A marking method for marking a location in a medical image, comprising following steps:
    providing a first marker within a first medical image, which shows an object, at a first location,
    determining a second location, which corresponds to the first location, within a second medical image showing the same object,
    determining an uncertainty of the correspondence of the first location and the second location,
    marking the second location with a second marker, which is different in appearance to the first marker, wherein the appearance of the second marker is provided in dependence on the determined uncertainty,
    presenting the first medical image, the first marker, the second medical image and the second marker.

8. A non-transitory, computer-readable storage medium containing a computer program for marking a location in a medical image, wherein the computer program comprises program code for causing a computer to carry out the steps of:
    providing a first marker within a first medical image, which shows an object, at a first location,
    determining a second location, which corresponds to the first location, within a second medical image showing the same object,
    determining an uncertainty of the correspondence of the first location and the second location,
    marking the second location with a second marker, which is different in appearance to the first marker, wherein the appearance of the second marker is provided in dependence on the determined uncertainty,
    presenting the first medical image, the first marker, the second medical image and the second marker.

* * * * *